United States Patent Office 3,192,137

Patented June 29, 1965

3,192,137

METHOD OF MANUFACTURING EXTERNAL, ELECTRICALLY CONDUCTIVE NOBLE-METAL LAYERS ON NON-METALLIC, ELECTRICALLY NON-CONDUCTIVE SUPPORTS

Cornelis Johannes Dippel and Hendrik Jonker, Eindhoven, Netherlands, assignors to North American Philips Company, Inc., New York, N.Y., a corporation of Delaware No Drawing. Filed July 11, 1960, Ser. No. 41,740
Claims priority, application Netherlands, July 27, 1959, 241,689
14 Claims. (Cl. 204—38)

The invention relates to a method of manufacturing external electrically conductive noble-metal layers on non-metallic, electrically non-conductive, at least superficially hydrophilized supports.

The term "noble-metal layers" is to be understood to means herein not only layers having uninterrupted surfaces of noble metal but also those having patterns of which the portions may or may not be coherent for example, station-name dials for radio apparatus, ornamental objects, printed wirings, printed circuits and so forth.

It is known to coat non-metallic, electrically non-conductive, frequently non-water-absorbing supports with a silver mirror by subjecting the surface of the support (for example glass or a high-polymeric synthetic substance) to a suitable preliminary treatment with a so-called "sensitizing solution," after which a so-called external silver-deposition is carried out by chemical reduction, silver metal being thus precipitated on this prepared surface from a solution of a silver compound with the aid of a suitable reducing agent. This sensitization or activation may be carried out, for example, by treating with a solution of stannous-chloride in hydrochloric acid. The solution of the silver compound is usually an ammonia silver nitrate solution containing silver amine cations, whilst the said reducing agent may be constituted by a great number of compounds, for example, formaldehyde, and other aldehydes, aliphatic amino-alcohols, reducing sacchari, soluble tartrates, hydroxylamine and hydrazine (see for example P. B. Upton, "The Metallizing of Glass and Plastics by the Reduction of Aqueous Solutions," J. Electrodep. Tech. Soc. 22, 45–72 (1947)).

A method is furthermore described (application Serial No. 41,730, filed July 11, 1960), in which the support surface is activated by treating it with an aqueous solution of an agent capable of reacting with a mercurous compound, in the presence of moisture, while separating out metallic mercury, and an aqueous solution of a mercurous compound, so that an at least partly external layer of mercury germs is obtained. This layer is intensified in the intensifying bath into an external, electrically conductive noble-metal layer.

This activation is based on the formation of mercury germs by reduction or by a so-called disproportioning of mercurous ions in accordance with one of the reaction equations:

$$Hg_2^{++} + 2e \rightarrow 2Hg$$

or $$Hg_2^{++} \rightarrow Hg^{++} + Hg$$

This disproportioning is achieved by withdrawing from the solution of the mercurous compound mercuric ions, which are always contained therein in a certain concentration. For this purpose the following means may be employed:

(a) The formation of sparingly soluble mercuric compounds, for example, by means of a compound containing $OH^-$ or $S^=$ ions;

(b) The formation of slightly dissociated mercuric compounds, for instance by means of compounds containing the following ions or molecules: $SO_3^=$, $CN^-$, $CNS^-$, $NO_2^-$, $I^-$, $S_2O_3^=$, $NH_3$ (if desired together with $NH_4^+$), ethylene diamine-tetraacetic acid and other complex-forming agents and their salts;

(c The formation of mercuric or organic compounds for instance by means of pyridine, thiourea and derivatives thereof.

In the method according to said patent application the metallic mercury is deposited in the form of an at least partly external, hardly visible or even quite invisible layer of mercury germs on the support. This layer is then caused, by using a germ mass intensification, to grow into an external, electrically conductive noble-metal layer.

The term "germ mass intensification" is to be understood to mean the intensification of a weak hardly visible or even quite invisible metal germ layer into a layer having the required metal mass, by means of a water-soluble noble-metal compound and a suitable reducing agent. For the said germ mass intensification can only be used ions and complex ions of metals nobler than copper, for example, silver, gold, platinum and so on. For the germ mass intensification there may be employed the conventional baths for chemical silver deposition, but use will preferably be made of the purely physical developers usually intended for photographic purposes, since because of their greater selectivity these developers allow a better control of the process to be obtained. Purely physical developers differ from the so-called chemical silver-deposition baths by the use of photographic reducing agents; these are compounds of which the reducing activity in the physical developer is accelerated, under the prevailing conditions, owing to the presence of a photographic metal germ image, to an extent such that a sufficiently selective noble-metal deposition on this metal germ image is obtained. A frequently used physical developer is, for instance, a solution of silver nitrate in water, to which is added metol, hydroquinone or p-phenylene-diamine. Such a developer contains furthermore, in general, in order to improve its preservability, or to control the developing speed, additional substances such as organic acids, buffer mixtures or substances forming complexes with the noble-metal compound.

The term "stabilised germ mass intensification" is to be understood to mean an intensification in which the spontaneous decomposition of the intensifying bath is materially delayed by adding one or more suitable, ionic surface-active compounds, if desired in conjunction with a non-ionic surface-active compound, so that this bath can be preserved for a considerably longer time. A germ mass intensification in which the use of ionic surface-active compounds is dispensed with is termed hereinafter a non-stabilized germ mass intensification.

In the above said patent application Serial No. 41,730 is described that in the presence of an ionogenic, surface-active compound as a stabiliser in the intensifying bath, external mercury germs do substantially not grow on, so that in the said case use is made of an intensifying bath which does not contain an ionogenic surface-active compound.

According to the invention external, electrically conductive noble-metal layers may be manufactured with an improved adhesion to the support surface. In the method of the invention in which the support surface is activated by treating it, in order of succession, with an aqueous solution of an agent capable of reacting with a mercurous compound, in the presence of moisture, while separating out metallic mercury, and an aqueous solution of a mercurous compound or conversely, and in which a noble metal layer is deposited on this activated surface from a solution of a noble-metal compound with a reducing agent for this compound, the bath containing the mercurous compound has added to it a silver compound and/or the intensifying bath has added to it, as a stabilizer, one or more suitable, ionogenic, surface-active compounds in conjunction or not in conjunction with a non-ionogenic surface-active compound.

If a slightly hydrophylic coating is provided on the support, the said agent or the mercurous compound, in conjunction or not in conjunction with the silver compound may be housed therein.

In accordance with the invention, described in said patent application Serial No. 41,730, it has been found that a partially internal location of the layer of mercury germs formed by activation is advantageous with respect to the adhesion of the final noble-metal layer to the support surface. In accordance with the present invention it was a surprise to find that the presence of a silver compound in the activating bath containing the mercurous compound favours the formation of the internal portion of the metal germ layer as compared with the formation of the external portion, thus resulting in an improvement in adhesion.

It has furthermore been found that, although, as stated above, the external portion of a metal layer does not grow on in a stabilized intensifying bath, the internal portion of a metal germ layer growing in such a bath and being at the point of growing out of the support, does not stop growing, but grows on for a certain time and that a resultant, outgrown electrically conductive noble-metal layer exhibits a particularly strong adhesion to the support surface. If desired, the adhesion already improved owing to the use of the silver compound in the activating bath containing the mercurous compound by causing the internal portion of the resultant metal germ layer, by using stabilized germ mass intensification, to grow into an external, electrically conductive noble-metal layer.

It has been found that by the method according to the invention reasonably reproducible, external noble-metal layers can be obtained, of which the electric resistance does not exceed $10^6$ ohms/square surface, if with the activation of the support surface use is made of a silver compound.

The best results are obtained, when the metal germ layer is produced by using an agent which, in the presence of moisture, separates out metallic mercury from a mercurous compound by disproportioning. Particularly suitable agents of this kind are: soluble thiosulphates and soluble carbonates.

If the agent performing the disproportioning of the mercurous compound is contained in the first bath, external, electrically conductive noble metal layers with a beautiful gloss and with excellent reproduceability are obtained by the method according to the invention by adding to the second bath, apart from the mercurous compound, one or more organic hydroxy acids selected from the group of citric acid, tartaric acid, glycolic acid, glycerol acid and malic acid. Then at least such a quantity of the acid concerned must be added that the precipitate initially formed with the mercurous compound is again dissolved.

The method according to the invention, in which the agent performing the disproportioning of the mercurous compound is provided first in the support surface, may be further simplified by combining the second bath containing the mercurous compound with the stabilized or non-stabilized physical developer into a single bath.

The method according to the invention may be employed for the manufacture of uninterrupted surfaces of noble metal on non-metallic supports and for the manufacture of noble-metal patterns thereon, as used for decorations, electrical and electro-technical uses. In the first case the whole support surface is to be subjected to the activation. In the second case either the pattern is provided previously by activating the surface in accordance with the pattern either directly by a printing technique or indirectly by a known mechanical or photographic masking process, or the pattern may be obtained on the resultant, uninterrupted noble-metal layer obtained in accordance with the invention by etching away the redundant noble metal after masking. All kinds of known methods of the photo-engraving and photographical industries may be employed in this case to apply a mask which resists the chemical treatments to be carried out. In many cases an external, electrically conductive noble-metal layer obtained in accordance with the invention is preferably subjected, in order to modify the physical and/or chemical properties of the layer or of its surface, to a thermal, mechanical, chemical electro-chemical or photographic after-treatment or to a combination of these after-treatments, in accordance with the use to be made of the layer.

Many uses of the external noble-metal layers obtained in accordance with the invention on no-metallic, electrically non-conductive, macro-molecular supports are found in the electrical and electro-technical fields. It is often important in this case that their electric resistance should not exceed by far that of corresponding layers containing the same quantity of noble metal in bulk and that this resistance should not vary greatly with time. The condition is frequently not fulfilled without the need for further means by the noble-metal layers obtained subsequent to germ mass intensification. By a thermal and/or chemical after-treatment and/or a mechanical polishing treatment the high resistance value may be reduced to a materially lower, reasonably constant and reproduceable value.

The thermal after-treatment is carried out by heating the noble-metal layer to a temperature of at least 80° C. The desired effect is attained sooner according as the after-treatment temperature is higher, but it must be considered that the material of the support forms a limit. The chemical after-treatment to reduce the electric resistance of external silver layers consists in that these layers are brought into contact with an aqueous solution containing one or more compounds separating off therein a hydrogen ion or an anion potential-determining anion with respect to the silver metal, for example, $Cl^-$, $Br^-$, $I^-$, $CNS^-$, $CN^-$, $S^=$, $SO_3^=$, $S_2O_3^=$ or $OH^-$. Mechanical polishing of the layer reduces, in many cases, the electric resistance of the layer to a sufficient extent. Moreover, such a treatment improves the optical (decorative) properties of the noble-metal layer.

For a great many uses in the electrical, electro-technical and decoration fields it is necessary or desirable that the external, electrically conductive noble-metal layer obtained in accordance with the invention should be subjected to an electro-chemical after-treatment, followed, if necessary, by a superficial chemical conversion or colouring.

To this end use may be made of, for example, electrolytic polishing, electrolytic deposition of metals, whilst using or not using an external current source, electrolytic colouring of the deposited metal or electrophoretical coating with a protective or insulating, or photo- and/or semi-conductive surface layer.

Even a combination of different electro-chemical and/or chemical after-treatments may be employed.

If the invention is to be employed for the manufacture of metal patterns which are electrolytically intensified or electrophoretically coated it will be preferred, prior to the required treatment, to provide the portions of the uninterrupted noble-metal layer not associated with the final pattern with a resistant mask with the aid of a mechanical or photographic process. The uncovered portions of the layer are then intensified or coated, while the uninterrupted layer provides the conductive contact between the portions of the final pattern. After the removal of the mask the pattern can be obtained by etching away the redundant noble metal. The mask may be applied as an alternative, after the electro-chemical after-treatment and the pattern is then obtained with the aid thereof by etching away the metal of the uncovered portions of the layer. However, this is less economical. For the various uses a selection may furthermore be made from a great number of known methods of after-treatment, which may be combined with the aforesaid methods of after-treatment. A few important suitable after-treatments of this kind are, inter alia: mechanical polishing of the surface of the layer, application of a lacquer or varnish layer to the surface of the layer, embedding of the layer, together with the support, in an insulating envelope of thermo-hardening or thermo-plastic material, transfer of the layer, if desired together with the support, to a further support of high electrical qualities, also of thermo-hardening or thermo-plastic material, application of electric connections by soldering (for example, dip soldering).

In electronics use may be made, for example, of external noble-metal layers manufactured by the method according to the invention in conjunction with one or more of the aforesaid after-treatments for manufacturing printed wiring, circuits, screen grids, switches and other components.

Substantially, all non-metallic, electrically non-conductive support materials, which are not yet as such accessible to a certain extent to the various after-treatment baths, may be hydrophilized to a certain extent by means of known methods, at least at the surface, either by using certain chemical surface treatments or by applying a thin, slightly hydrophilic coating. For example, polystyrene, polyacrylate, Bakelite and various other high-polymeric products may be rendered accessible by a surface treatment with chlorosulphonic acid (T. Westermark, Acta Chem. Scand. 6, 1194–1199 (1952)). Cellulose esters, polyvinylacetate and -chloride and so on can be rendered usable by superficial saponification; glass can be provided by a chemical surface treatment or by casting with a layer of silica gel (F. L. Burmistrow, Photo. Journ. 76, 452–459 (1936)). Gelatin, regenerated cellulose, paper, wood, polyvinyl alcohol and so on may be used without the need for further means.

EXAMPLES

I. Strips of a superficially saponified cellulose triacetate foil were impregnated for two minutes in aqueous solutions of the agents indicated in the first column of Table I, all of which are capable of reacting with the mercurous compound, in the presence of moisture, while separating out metallic mercury. The concentrations used of these substances in the impregnation solutions are also indicated in this table. The strips were then wiped off and dried in air at room temperature with the exception of the strips impregnated in sodium sulphite, which were dried in a nitrogen atmosphere. Then the strips were dipped for a few seconds in one of the baths (*a*) or (*b*). These baths had the following compositions:

| | Mol/litre |
|---|---|
| Bath (*a*): | |
| Mercurous nitrate | 0.005 |
| Silver nitrate | 0.001 |
| Nitric acid | 0.005 |
| Bath (*b*): | |
| Mercurous nitrate | 0.005 |
| Silver nitrate | 0.01 |
| Nitric acid | 0.005 |

In both cases the solvent was distilled water. Then the strips were washed for 10 sec. in distilled water and the layers of mercury germs, if any, were intensified for 10 min. by physical developing solutions of 0.5 g. of metol, 2 g. of citric acid and 0.2 g. of silver nitrate in 100 g. of distilled water. Finally the strips were washed in water and dried in air.

In Table I is designated by (+) when external, electrically conductive silver layers were obtained on the strips (electric resistance not exceeding $10^6$ ohms/square surface); (−) designates that the concentrations concerned cannot be used for activating the strips by the method according to the invention.

*Table I*

| Agent | Bath *a* | | | | | | Bath *b* | | | | | |
|---|---|---|---|---|---|---|---|---|---|---|---|---|
| | Concentration, mol/litre | | | | | | | | | | | |
| | 0.003 | 0.006 | 0.012 | 0.025 | 0.05 | 0.1 | 0.003 | 0.006 | 0.012 | 0.025 | 0.05 | 0.1 |
| $Na_2CO_3$ | − | + | + | + | + | ------ | − | + | + | + | + | ------ |
| $Na_2S_2O_3$ | − | − | + | + | + | ------ | ------ | ------ | ------ | ------ | ------ | ------ |
| $Na_2SO_3$ | − | − | − | + | + | ------ | − | − | − | + | + | ------ |
| KCNS | − | − | − | + | + | + | ------ | ------ | ------ | ------ | ------ | ------ |
| KCN | − | − | − | − | + | + | − | − | − | − | + | + |
| Allylthiourea | − | − | − | − | + | + | ------ | ------ | ------ | ------ | ------ | ------ |
| $NaNO_2$ | − | − | − | − | − | + | − | − | − | − | − | + |
| KI | − | − | − | − | − | + | ------ | ------ | ------ | ------ | ------ | ------ |
| $Sn(BF_4)_2$ | − | − | − | + | + | + | ------ | ------ | ------ | ------ | ------ | ------ |

The adhesion of the resultant silver layers to the support is better than that of silver layers obtained in a similar manner by means of a mercurous nitrate solution without the addition of silver nitrate.

By carrying out the intensification, not with the said solution, but with one of the following physical developers, which contain per 100 g. of distilled water:

(*a*) 0.5 g. of metol, 2 g. of lactic acid, 0.1 g. of silver nitrate (developing time 10 min.)

(*b*) 1 g. of hydroquinone, 0.2 g. of citric acid and 0.1 g. of silver nitrate (developing time 15 min.)

(*c*) 1 g. of hydroquinone, 0.1 g. of lactic acid, and 0.1 g. of silver nitrate (developing time 12 min.)

(*d*) 0.5 g. of pyrogallol, 1 g. of citric acid and 0.1 g. of silver nitrate (developing time 15 min.), or with a silver deposition solution obtained by mixing 20 parts by volume of the solution (1), 5 parts by volume of the solution (2) and 1.1 parts by volume of the solution (3), which solutions have the following compositions:

Solution (1): 1 g. of silver nitrate, 2.5 g. of ammonium nitrate and 100 g. of distilled water;

Solution (2): 1.6 g. of sodium hydroxide and 100 g. of distilled water;

Solution (3): 1.25 g. of hydrazine sulphate and 100 g. of distilled water, qualitatively similar results are obtained.

II. Table II refers to strips of the support material of Example I, treated in the manner described in the said example, on the understanding that after impregnation in the solutions of the agents, they were wiped off but not intermediately dried, so that they were immediately dipped in one of the baths (*a*) and (*b*) of Example I. The references in Table II denote the same as those of Table I.

*Table II*

| Agent | Bath *a* | | | | | | Bath *b* | | |
|---|---|---|---|---|---|---|---|---|---|
| | Concentration, mol/litre | | | | | | | | |
| | 0.012 | 0.025 | 0.05 | 0.1 | 0.2 | 0.4 | 0.012 | 0.025 | 0.05 |
| $Na_2CO_3$ | − | − | − | + | + | + | ------ | ------ | ----- |
| $Na_2S_2O_3$ | − | + | + | ---- | ---- | ---- | − | − | + |
| $Na_2SO_3$ | − | − | + | ---- | ---- | ---- | − | + | + |

Also in this case an improved adhesion to the support can be assessed for the silver layers, which have been obtained subsequent to activation by means of silver-salt-containing mercurous nitrate solutions.

III. Strips of the support material of Example I were impregnated for two minutes in aqueous solutions containing 0.008 to 0.016 and 0.032 mol./litre of sodium thiosulphate.. After wiping off and drying in air, the rear side of the support was coated with a lacquer layer. Then the strips were treated for 10 min. in a combined bath to achieve the activation and to intensify the formed metal germ layer, this bath containing:

| | Mol./litre |
|---|---|
| Mercurous nitrate | 0.005 |
| Metol | 0.025 |
| Citric acid | 0.1 |
| Silver nitrate | 0.01 |

Finally the strips were washed and dried. No external silver layer was obtained on the strips treated with the most diluted thiosulphate solution. On the two other strips external silver layers were obtained of which the electric resistances amounted to 10,000 and 1000 ohms/square surface respectively, which values dropped, subsequent to a thermal treatment at 150° C. for one hour, to 15 and 1 ohms/square surface respectively.

IV. Strips of the support material of Example I were impregnated for two minutes in one of the following aqueous solutions:

| | Mol./litre |
|---|---|
| (*a*) Sodium carbonate | 0.025 |
| (*b*) Sodium thiosulphate | 0.05 |

After wiping off and drying in air, the strips were dipped for a few seconds in an activating bath (*a*) of Example I. The intensification of the mercury germ layers on the strips took place in the manner described in Example I. Then different pieces of the strips were subjected to a thermal after-treatment (at 15° C. for one hour), to a chemical after-treatment (for one minute in a solution of potassium chloride, obtained by dissolving 1 g. in 1 litre of water), and to a chemical polishing treatment (rubbing with a plug of cotton-wool). The results of these experiments are indicated in Table III.

*Table III*

| Agent | After-treatment | | | |
|---|---|---|---|---|
| | None | Thermal | Chemical | Mechanical |
| | Electric resistance, ohms/square surface | | | |
| $Na_2CO_3$ | 390 | 0.5 | 1 | 71 |
| $Na_2S_2O_3$ | 21 | 1.2 | 4.1 | 4 |

V. Unilaterally white, woodfree litho paper was impregnated for 30 sec. on one side in an aqueous solution containing 0.05 mol of sodium thiosulphate per litre. After wiping off, blotting between filter paper and drying in air, the paper was dipped for a few seconds in the activating bath (*a*) of Example I. After washing in distilled water, the mercury germ layer obtained by the activation was intensified in the physical developer of Example I. Finally the paper with the external silver layer was washed in water and dried in air. The resistance of the silver layer was 46 ohms/square surface.

VI. Strips of the support material of Example I were impregnated for two minutes in aqueous solutions containing (*a*) 0.001 to (*b*) 0.002–(*c*) 0.004–(*d*) 0.008–(*e*) 0.016 and (f) 0.032 mol/litre of sodium carbonate or sodium thiosulphate respectively. After wiping off and drying the rear side of the support was covered with a lacquer layer. Then the strips were dipped for a few seconds, in order to achieve the activation, in an aqueous solution containing 0.005 mol of mercurous nitrate and 0.005 mol of nitric acid. After washing for a short time in distilled water the strips were intensified in a stabilized physical developer obtained by dissolving, in distilled water:

| | | |
|---|---|---|
| Metol | mol/litre | 0.025 |
| Citric acid | do | 0.1 |
| Silver nitrate | do | 0.01 |
| "Lissapol N" | percent by weight | 0.02 |
| "Armac 12D" | do | 0.02 |

Finally the strips were washed in water and dried in air. Of the strips subjected to the sodium carbonate only those impregnated in the solutions (*a*) and (*b*) did not possess an external silver layer after 30 min. of intensification. The silver layers on the other strips had electric resistances varying between about 100 and 700 ohms/square surface. These values dropped, after a thermal treatment at 150° C. for one hour, to 0.5 and 1.5 ohms/square surface. Of the strips impregnated in sodium thiosulphate only those treated with the solution (*a*) did not exhibit an external silver layer after 30 min. of intensification. If the intensification was prolonged to 120 min., whilst the intensifying bath was refreshed after 60 min., all strips had external silver layers with resistance values of about 100 to 3500 ohms/square surface (after the said thermal treatment 0.25 to 40 ohms/square surface). The adhesion of the silver layers to the supports is materially better than that of the silver layers obtained by using non-stabilized, physical developers. An activated, stabilized developer to obtain external silver layers, by means of which the development takes a considerably shorter time, has the following composition:

| | G. |
|---|---|
| Metol | 5 |
| Citric acid | 0.625 |
| Silver nitrate | 4 |
| "Sapamine KW" | 0.2 |
| "Alamac 26D" | 0.3 |
| Water | 1000 |

It permits of obtaining external silver layers already after a few minutes.

VII. Strips of unilaterally white, woodfree litho paper were impregnated on one side for 30 sec. in aqueous solutions containing (*a*) 0.008, (*b*) 0.016 and (*c*) 0.032 mol/litre of sodium thiosulphate. After wiping off, blotting between filter paper and drying in air, the strips were treated for a few seconds with the mercurous nitrate solution of the preceding example. After washing in distilled water the mercury germ layers obtained by the activation were intensified for 30 min. in the first-mentioned stabilized physical developer of Example VI and, for comparison, for 10 min. in the corresponding non-stabilized developer, from which the surface-active components had been omitted. Finally the strips were washed in water and dried in air. When using the non-stabilized developer only the strips treated with the solution (*c*) had an external, electrically conductive silver layer. When using the stabilized developer also the strips treated in the solutions (*a*) and (*b*) had external silver layers. In the latter case the electric resistances of the layers amounted to 350 and 100 ohms/square surface respectively. The aforesaid thermal after-treatment reduced this value to 4 and 13 ohms/square surface respectively.

Also in this case the use of the stabilized development provided an improvement in adhesion.

VIII. Strips of the support material of Example I were impregnated for two minutes in aqueous solutions containing: (*a*) 0.004, (*b*) 0.008, (*c*) 0.016 and (*d*) 0.032 mol/litre of sodium thiosulphate. After wiping off and drying the rear side of the support was covered with a lacquer layer. Then the strips were treated, in order to achieve the activation, with an aqueous solution of the following composition:

| | Mol/litre |
|---|---|
| Mercurous nitrate | 0.0005 |
| Silver nitrate | 0.01 |
| Citric acid | 0.1 |

for a few seconds. Then the strips were again washed in distilled water. They were developed for 10 minutes with the non-stabilized developer of Example VII. In the cases (*b*), (*c*) and (*d*) external silver layers were obtained having resistances lying betwen 600 and 20,000 ohms/square surface; after the thermal treatment at 150° C. for 1 hour, they were reduced to 1.5–60 ohms/square surface. When developing for 60 min. in the stabilized developer of Example VII, all solutions (*a*) to (*d*) produced external silver layers having resistances from 600 to 750 ohms/square surface; after the thermal treament at 150° C. for one hour, these resistances dropped to 2 ohms/square surface. These layers exhibited an improved gloss as compared with those treated with mercurous nitrate-nitric acid solutions not containing citric acid. A strip treated with the solution (*d*) was developed physically for 10 min. in one of the said ways was intensified electrolytically with a few microns of copper by using an aqueous copper-deposition bath of the following composition: copper sulphate ($5H_2O$), 200 g./litre; concentrated sulphuric acid, 50 g./litre, and phenolsulphonic acid sodium, 0.5 g./litre. Use was made of a current density of 5 a./dm.$^2$ for 2 min. This copper layer was then coated electrophoretically with a layer of alumina by means of a suspension of 10% of Alundum in methanol with a field strength of 37.5 v./cm. for 6 sec. the current intensity being 70 ma.

IX. An external silver layer applied in the manner described in Example VIII with the aid of solution (*d*) to the support material of Example I was covered, by pouring out or spraying, with a uniform layer of "Kodak Photoresist." After drying in air, the light-sensitive layer was exposed behind a negative of a line grid for 5 min. with the aid of a high-pressure, mercury vapour lamp of 500 w. at a distance of about 5 cms. After the exposure the layer was "developed" with "Kodak Photoresist Developer" or with trichloroethylene. Then the mask was hardened by treating it for about 10 min. at 150° C. The uncovered parts of the silver layer were electrolytically intensified with copper for 15 min. with a current density of 4a./dm.$^2$ in a bath containing 20% by weight of copper sulphate ($5H_2O$) and 6% by weight of sulphuric acid in distilled water. After the removal of the mask the non-intensified silver layer was removed by etching. If desired, the metal layer may finally be provided with a protective lacquer layer or a layer of thermo-hardening or thermo-plastic material. Thus, satisfactory screening grids can be manufactured.

X. On the support material of Example VII was stamped with the aid of a rubber stamp, wetted by an inking pad with a solution of 0.05 mol/litre of sodium carbonate in water, the desired pattern. The sodium carbonate solution had been rendered slightly viscous with the aid of a thickening agent. The achievement of the activation took place with the aid of a bath containing per litre 0.005 mol of mercurous nitrate and 0.001 mol of silver nitrate. After washing in distilled water, the material was developed for 30 min. in the stabilized developer of Example VII. An external, electrically conductive silver pattern was obtained on the paper.

What is claimed is:

1. A method of manufacturing external, electrically conductive noble-metal layers on non-metallic, electrically non-conductive, at least superficially hydrophilized supports, comprising the steps of activating the support surface by applying to this surface an aqueous solution of a compound capable of liberating mercury metal from a mercurous compound in the presence of moisture, said compound, capable of liberating mercury metal, being selected from the group consisting of compounds that reduce mercurous compounds to form free mercury metal and compounds that form free mercury metal from mercurous compounds by a disproportionating reaction, and an aqueous solution of a mercurous compound and a silver compound to thereby form a barely visible silver-amalgam layer on said non-metallic support, and then applying to this activated surface a solution of a noble-metal compound, and a reducing agent for the noble-metal compound, whereby a noble metal layer is formed on the support surface.

2. The method of claim 1 wherein the compound capable of liberating mercury metal does so by a disproportionating reaction.

3. The method of claim 2 wherein the compound capable of liberating mercury metal is selected from the group consisting of soluble thiosulphates and soluble carbonates.

4. The method of claim 2 wherein the compound capable of liberating mercury metal is first added to the support surface, and the bath containing the mercurous compound is combined with a physical developer into a single bath.

5. The method of claim 2 wherein the agent providing the disproportioning of the mercurous compound is applied, first, to the support surface, and to the aqueous solution containing the mercurous and silver compounds there is added an organic hydroxy acid selected from the group of citric acid, tartaric acid, glycolic acid, glycerol acid and malic acid in such a quantity that the precipitate initially formed with the mercurous and silver compound is redissolved.

6. The method of claim 1 wherein the noble metal layer is a silver layer and this silver layer is treated with an aqueous solution containing at least one soluble compound having a potential determining anion with respect to the silver metal, said potential determining ion being selected from the group consisting of $Cl^-$, $Br^-$, $I^-$, $CNS^-$, $CN^-$, $S^=$, $SO_3^=$, $S_2O_3$ and $OH^-$.

7. The method of claim 11 wherein the noble metal layer is a silver layer and this silver layer is treated with an aqueous solution of a compound selected from the group consisting of non-oxidizing acids and acidic salts.

8. The method of claim 1 wherein the noble-metal layer is heated to a temperature of at least 80° C.

9. The method of claim 1 wherein the noble-metal layer is subjected to mechanical polishing.

10. The method of claim 1 wherein a colloidal material is deposited electrophoretically on the resultant metal layer.

11. A method of manufacturing an external, electrically conductive noble-metal pattern on a non-metallic, electrically non-conductive base comprising the steps, providing an external, electrically conductive noble metal layer on a non-metallic, electrically non-conductive, at least superficially hydrophilized, support in accordance with the method of claim 1, placing an etch resistant mask over a desired portion of the noble metal layer in a manner such that only desired portions of the noble metal layer are covered by said mask, etching away the uncovered portions of the noble metal layer and removing said mask.

12. The method of claim 11, wherein the resultant metal pattern is subjected to a mechanical after-treatment.

13. The method of claim 11 wherein the noble-metal layer obtained is intensified electrolytically.

14. The method of claim 13 wherein the resultant metal layer is subjected afterwards to polishing.

References Cited by the Examiner

UNITED STATES PATENTS

| | | | |
|---|---|---|---|
| 641,709 | 1/00 | Legate | 204—33 |
| 1,497,265 | 6/24 | Haas. | |
| 1,720,216 | 7/29 | Gray et al. | 204—43 |
| 1,827,142 | 10/31 | De Trairup | 204—43 |
| 2,195,231 | 3/40 | Weder | 204—40 |
| 2,906,582 | 9/59 | Fahnoe et al. | 204—181 |
| 2,940,018 | 6/60 | Lee | 204—15 |

JOHN H. MACK, *Primary Examiner.*

JOSEPH REBOLD, *Examiner.*